(12) United States Patent
Cabioch et al.

(10) Patent No.: US 6,384,164 B2
(45) Date of Patent: May 7, 2002

(54) PROCESS FOR THE PREPARATION OF A BRANCHED DIENE ELASTOMER VIA AN ANIONIC ROUTE

(75) Inventors: Jean-Luc Cabioch, Chateaugay; Nicole Dajoux, Ceyrat, both of (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/842,524

(22) Filed: Apr. 25, 2001

(30) Foreign Application Priority Data

Apr. 25, 2000 (FR) .............................. 00 05344

(51) Int. Cl.$^7$ .............................. C08F 4/44; C08F 8/40
(52) U.S. Cl. ................ 526/179; 526/183; 526/193; 526/335; 526/340; 526/340.2; 525/332.9; 525/333.1; 525/333.2; 525/340
(58) Field of Search .................. 526/86, 179, 183, 526/193, 335, 340, 340.2; 525/332.9, 333.1, 333.2, 340

(56) References Cited

U.S. PATENT DOCUMENTS 3,803,266 A * 4/1974 Kahle et al. ............. 526/179 X
4,539,136 A * 9/1985 Broekhuis ............... 525/340 X
5,266,649 A * 11/1993 Balas et al. ............. 525/342 X

* cited by examiner

Primary Examiner—Fred Teskin
(74) Attorney, Agent, or Firm—Baker Botts LLP

(57) ABSTRACT

The present invention provides a process for preparing a branched diene elastomer having a high proporation of starred chains comprising anionically polymerizing at least one conjugated diene monomer having 4 to 12 carbons in a polymerization medium comprising a hydrocarbon solvent, such as cyclohexane, and an organometallic initiator, such as n-butyllithium, wherein tris-(2,4-di-tert-butylphenyl) phosphite is added to the polymerization medium as a starring agent during or at the end of polymerization in an amount such that the molar ratio of the starring agent to the initiator is between 0.1 and 1.5, preferably between 0.2 and 0.5. The process produces a branched diene elastomer having a high proportion of starred chains. The elastomer can be a homopolymer, such as polybutadiene or polyisoprene or a copolymer, such as polystyrene/polybutadiene.

12 Claims, No Drawings

PROCESS FOR THE PREPARATION OF A BRANCHED DIENE ELASTOMER VIA AN ANIONIC ROUTE

BACKGROUND OF THE INVENTION

The present invention is directed to a process for preparing a branched diene elastomer via an anionic route. The invention is particularly applicable to obtaining a starred elastomer.

There are a number of processes for preparing branched diene polymers by anionic routes. For example, U.S. Pat. Nos. 3,692,874 and 3,244,664 disclose processes that utilize halogenosilanes as coupling agents to obtain such polymers. Likewise, U.S. Pat. No. 4,914,248 and European specification EP-A-260 325 provide processes which utilize polyepoxides. European patent specifications EP-A-207 562 and EP-A-423 571, disclose processes using hexatriene and a polyethynylbenzene. U.S. Pat. No. 4,523,628 discloses preparing a starred elastomer using halogenated phosphines.

U.S. Pat. No. 3,803,266 provides a single example directed to the preparation of a starred block copolymer of styrene and butadiene using triethylphosphite. The '266 Patent also discloses that trialkylphosphites, wherein each alkyl group has 1 to 10 carbon atoms, preferably 1 or 2 carbon atoms, and triarylphosphites, wherein each aryl group has 1 to 12 carbon atoms, may be used in preparing the starred block copolymer.

U.S. Pat. No. 4,539,136 discloses a trifunctional starring agent, a tris-(nonylphenyl)phosphite used to produce a block diene copolymer of a conjugated diene and a vinylaromatic monomer, via an anionic route. The block copolymer has a high proportion of starring. The reference provides that a wide range in the value of the molar ratio between the quantity of starring agent and that of the lithiated initiator is allowed.

The examples of the '136 Patent disclose first reacting an organometallic initiator, such as sec-butyllithium, in cyclohexane with styrene to obtain a polystyrene and then adding butadiene to the polymerization product. Once the butadiene has polymerized completely, the trifunctional starring agent is added to the block copolymer so obtained in an amount such that the ratio between the number of moles of the starring agent and the number of moles of the initiator (molar ratio) ranges from 0.19 to 1.05.

SUMMARY OF THE INVENTION

The inventors have surprisingly discovered an improved process for the preparation of a branched diene elastomer having a high proportion of starred chains.

Thus, the present invention provides a process for preparing a branched diene elastomer having a high proportion of starred chains comprising anionically polymenrizing at least one conjugated diene monomer having 4 to 12 carbons in a polymerization medium comprising a hydrocarbon solvent and an organometallic polymerization initiator wherein tris-(2,4-di-tert-butylphenyl)phosphite added as the starring agent to the polymerization medium during or at the end of the polymerizing in an amount such that the molar ratio of the starring agent to the initiator is between 0.1 and 1.5, wherein a branched diene elastomer having a high proportion of starred chains is produced.

In the present invention, "diene elastomer" means a homopolymer or copolymer obtained at least in part from diene monomers, i.e., monomers having two carbon-carbon conjugated or non-conjugated double bonds.

In accordance with the invention, the diene elastomer prepared by the process may be entirely a homopolymer obtained by polymerization of a conjugated diene monomer having 4 to 12 carbons, or a copolymer obtained by copolymerization of one or more dienes conjugated between one another or with one or more vinylaromatic compounds having 8 to 20 carbons.

DETAILED DESCRIPTION OF THE INVENTION

The present invention provides a process for preparing a branched diene elastomer having a high proportion of starred chains comprising anionically polymerizing at least one conjugated diene monomer having 4 to 12 carbons in a polymerization medium comprising a hydrocarbon solvent and an organometallic polymerization initiator, wherein tris-(2,4-di-tert-butylphenyl)phosphite is added as a starring agent to polymerization medium during or at the end of the polymerizing in an amount such that the molar ratio of the starring agent to the initiator is between 0.1 and 1.5, wherein a branched diene elastomer having a high proportion of starred chains is produced.

Prior to the present invention it was not known to use tris-(2,4-di-tert-butylphenyl)phosphite as a starring agent. Heretofore, tris-(2,4-di-tert-butylphenyl)phosphite has only been known as an agent which protects or stabilizes polymers. See, for example, European patent specification EPA 048 562.

In accordance with the invention, the diene elastomer may be a homopolymer obtained by polymerizing a conjugated diene monomer having 4 to 12 carbon atoms or a copolymer formed by copolymerization of one or more diene monomers with each other or with a vinylaromatic compound having 8 to 20 carbon atoms.

In accordance with the present invention, suitable conjugated dienes for use in the process include 1,3-butadiene (butadiene), 2-methyl-1,3-butadiene (isoprene), 2,3-diethyl-1,3-butadiene, 2-methyl-3-ethyl-1,3-butadiene, 2-methyl-3-isopropyl- 1,3-butadiene, an aryl-1,3-butadiene, 1,3-pentadiene, and 2,4-hexadiene. Butadiene and isoprene are preferred.

Suitable vinylaromatic compounds include styrene, ortho-methylstyrene, meta-methylstyrene or para-methylstyrene, the commercially available mixture "vinyltoluene", para-tertiobutylstyrene, and divinylbenzene. Styrene is preferred.

Copolymers may contain between 99% and 20% by weight of diene units and between 1% and 80% by weight of vinylaromatic units.

Particularly preferred polymers include polybutadienes, especially those with a content of −1,2 units between 8% and 80%; polyisoprenes; copolymers of butadiene-styrene; especially those having a styrene content between 4% and 50% by weight, more particularly between 20% and 40% by weight, a content of −1,2 units of the butadiene portion between 8% and 65% and a content of trans-1,4 units between 30% and 80%; copolymers of butadiene-isoprene, especially those having an isoprene content between 5% and 90% by weight; and copolymers of isoprene-butadiene, especially those having an isoprene content between 5% and 90% by weight.

Suitable butadiene/styrene/isoprene copolymers include those having a styrene content between 5% and 50% by weight, more particularly between 10% and 40%, an isoprene content between 15% and 60% by weight, more particularly between 20% and 50%, and butadiene content between 5% and 50%, more particularly between 20% and 40% by weight. Said butadiene/styrene/isoprene copolymers have a content of −1,2 units between 4% and 85% and a content of trans-1,4 units between 6% and 80% of the butadiene part, a content of −1,2 units plus −3,4 units of the isoprene part between 5% and 70%, and a content of trans-1,4 units of the isoprene part between 10% and 50%.

The hydrocarbon solvent used in the polymerization medium may be selected from among toluene, cyclohexane, methylcyclohexane, heptane, n-hexane, cyclopentane, and mixtures containing two of these solvents.

The organometallic initiator used to initiate polymerization is preferably an organolithium compound, more preferably n-butyllithium.

In accordance with the invention, the tris-(2,4-di-tert-butylphenyl)phosphite starring agent may be added during or at the end of the homopolymerization reaction of a conjugated diene monomer or the copolymerization reaction of the conjugated diene monomer with a vinylaromatic monomer.

The starring agent is added in an amount such that the molar ratio of starring agent to initiator is between 0.1 to 1.5, preferably between 0.2 to 0.5.

The homopolymerization or copolymerization reaction may be carried out either as a continuous or a discontinuous (batch) process.

In accordance with the invention, the polymerization medium may additionally comprise a polar compound selected from the group consisting of diethers, diamines, tetrahydrofurans, and tetrahydrofurfuryl ethers.

A preferred diamine is tetramethylethylenediamine. Preferred diethers are 1,2-diethoxyethane, 1,2-dimethoxyethane, while preferred tetrahydrofurfuryl ethers include the tetrahydrofurfurylmethylethers, tetrahydrofurfurylethylethers and tetrahydrofurfurylpropylethers. THF is a preferred tetrahydrofuran.

The aforesaid characteristics of the present invention and others will be better understood on reading the following non-limiting examples of the invention, which are presented for illustration purposes.

In the examples below, the Mooney viscosity ML (1+4) at 100° C. is determined in accordance with Standard ASTM D-1646.

The viscosities provided for the obtained elastomers are inherent viscosities determined at a concentration of 1 g/l in toluene at 25° C.

The size exclusion chromatography (SEC) technique was used to determine the fractions by weight of starred chains in samples of the elastomers. In this technique the macromolecules are separated physically according to their respective sizes in the swollen state, in columns filled with a porous stationary phase. SEC was carried out using a model "150C" chromatograph marketed by "WATERS" using a bank of two "WATERS" columns, type "STYRAGEL HT 6 E".

The near-infra-red radiation technique was used to determine the microstructural characteristics relating to the branched elastomers obtained. This measurement utilized a spectrometer marketed by "BRUKER".

EXAMPLE 1

Discontinuous (batch) Preparation of a Starred Polybutadiene 10 grams of butadiene were injected into a 250 cc bottle containing 70 grams of cyclohexane. After neutralization of the impurities with n-butyllithium, 0.0002 moles of active n-butyllithium were added and polymerization was carried out at 60° C.

When the conversion rate reached 100% (viscosity of 0.84 dl/g), 0.000075 moles of tris-(2,4-di-tert-butylphenyl) phosphite were injected into the bottle. The solution was stirred for 10 min at 60° C. The polymerization was stopped and the polymer was anti-oxidized by adding 0.2 parts per 100 parts by weight elastomer (phr) of 2,2'-methylene-bis-(4-methyl-6-tertiobutylphenol) and 0.2 phr of N-(1,3-dimethylbutyl)-N'-phenyl-p-phenylenediamine.

The polymer was recovered by the classical operation of stripping of the solvent with steam, and then drying on a dryer at 100° C. for 15 min.

The inherent viscosity of the polymer after stripping and drying was 1.42 dl/g.

Analysis of the polymer by near-infra-red radiation showed that the polybutadiene so prepared contained 10% by weight of vinyl links.

The fraction by weight of starred chains, determined by size exclusion chromatography (SEC), was approximately 80%.

EXAMPLE 2

Discontinuous Preparation of a Starred Styrene/butadiene Copolymer 230 g of styrene, 410 g of butadiene and 1150 ppm of tetrahydrofuran (THF) were injected into a 10-liter reactor containing 5.81 of cyclohexane. After neutralizing the impurities with n-butyllithium, 0.0065 moles of active n-BuLi were added and polymerization was carried out at 40° C.

After 40 min of polymerization, wherein the conversion rate was 75% and the viscosity, determined on a sample, was 0.94 dl/g, 0.0025 moles of tris-(2,4-di-tert-butylphenyl) phosphite in a 0.05 mole/liter cyclohexane solution were injected into the reactor and the solution was stirred for 15 min at 40° C. The copolymerization reaction was then stopped and the copolymer obtained was anti-oxidized as in Example 1.

The copolymer was recovered by the classical operation of stripping of the solvent with steam, and then drying on a dryer at 100° C. for 15 min.

The inherent viscosity of the copolymer after stripping and drying was 1.59 dl/g, and its Mooney viscosity ML (1+4, 100° C.) was 35.

Near-infra-red radiation analysis of the styrene/butadiene copolymer obtained in this Example showed that it contained 24% by weight of styrene, and that the butadiene fraction contained 40% by weight of vinyl links.

The fraction by weight of starred chains, determined by the SEC technique, was 70%.

EXAMPLE 3

Continuous Preparation of a Starred Styrene/butadiene Copolymer

The polymerization was carried out in a 14-liter reactor, having a lead-in line.

Cyclohexane, butadiene, styrene and tetramethylethylenediamine in respective proportions of 100/12.2/2.3/0.009 were added to the reactor.

200 micromoles of n-butyllithium per 100 g of the monomers were then injected into the reactor lead-in line to neutralize the protic impurities introduced by the various constituents present in the lead-in line.

1450 micromoles of active n-butyllithium per 100 g of monomers were then injected at the inlet of the reactor.

The various flow rates were adjusted in relation to one another so that the average dwell time in the reactor was 40 min. The temperature was held at 80° C. The copolymerization conversion rate, determined on a sample taken at the reactor outlet, was 92%. The inherent viscosity of the copolymer was 1.15 dl/g.

500 micromoles of tris(2,4-di-tert-butylphenyl)phosphite were then injected into the reactor and the mixture was stirred with a dynamic mixer equipped with a stirrer set to a speed of 2500 rpm. After 4 min, the copolymer so obtained was anti-oxidized as in Example 1.

The copolymer was separated from its solution by a steam stripping operation lasting 20 min, and the copolymer so extracted was then dried on a cylinder-type dryer at 100° C. for 15 min.

The inherent viscosity of the starred copolymer was 170 dl/g and its Mooney viscosity ML (1+4, 100° C.) was 52. Moreover, the copolymer contained 43% by weight of styrene and 44% by weight of vinyl units in the butadiene portion.

We claim:

1. A process for preparing a branched diene polymer elastomer having a high proportion of starred chains comprising:

anionically polymerizing a conjugated diene monomer having 4 to 12 carbon in a polymerization medium comprising a hydrocarbon solvent and an organometallic polymenzation initiator, wherein tris-(2,4-di-tert-butylphenyl)phosphite is added to the polymerization medium during or at the end of polymerizing in an amount such that the molar ratio of tris-(2,4-di-tert-butylphenyl)phosphite to the initiator is between 0.1 and 1.5.

2. A process for producing a branched polybutadiene elastomer having a high proportion of starred chains comprising:

anionically polymerizing a butadiene monomer in a polymerization medium comprising a hydrocarbon solvent and an organometallic polymerization initiator, wherein tris-(2,4-di-tert-butylphenyl)phosphite is added to the polymerization medium during or at the end of polymerizing in an amount such that the molar ratio of tris-(2,4-di-tert-butylphenyl)phosphite to the initiator is between 0.1 and 1.5.

3. A process for producing a branched polyisoprene elastomer having a high proportion of starred chains comprising:

anionically polymerizing an isoprene monomer in a polymerization medium comprising a hydrocarbon solvent and an organometallic polymerization initiator, wherein tris-(2,4-di-tert-butylphenyl)phosphite is added to the polymerization medium during or at the end of polymerizing in an amount such that the molar ratio of tris-(2,4-di-tert-butylphenyl)phosphite to the initiator is between 0.1 and 1.5.

4. A process for preparing a branched polystyrene/polybutadiene copolymer having a high proportion of starred chains comprising:

anionically copolymerizing styrene and butadiene monomers in a polymerization medium comprising a hydrocarbon solvent and an organometallic polymerization initiator, wherein tris-(2,4-di-tert-butylphenyl)phosphite is added to the polymerization medium during or at the end of the copolymerizing in an amount such that the molar ratio of tris-(2,4-di-tert-butylphenyl)phosphite to the initiator is between 0.1 and 1.5.

5. The process according to any one of claims 1, 2, 3 or 4 wherein the molar ratio of tris-(2,4-di-tert-butylphenyl)phosphite to initiator is between 0.2 and 0.5.

6. The process according to any one claims 1, 2, 3 or 4 wherein the initiator is an organolithium.

7. The process according to any one of claims 1, 2, 3 or 4 wherein the initiator is n-butyllithium.

8. The process according to any one of claims 1, 2, 3 or 4 wherein the hydrocarbon solvent is selected from the group consisting of toluene, cyclohexane, methyl cyclohexane, heptane, n-hexane, cyclopentane and mixtures thereof.

9. The process according to any one of claims 1, 2, 3 or 4 wherein the polymerization medium further comprises a polar compound selected from the group consisting of diethers, diamines, tetrahydrofurans and tetrahydrofurfuryl ethers.

10. A process for preparing a starred polybutadiene elastomer having a high proportion of starred chains comprising:

anionically polymerizing a butadiene monomer in a polymerization medium comprising cyclohexane and n-butyllithium, wherein tris-(2,4-di-tert-butylphenyl)phosphite is added to the polymerization medium at the end of polymerization in an amount such that the molar ratio of tris-(2,4-di-tert-butylphenyl)phosphite to n-butyllithium is between 0.2 and 0.5.

11. A process for preparing a starred polystyrene/polybutadiene copolymer having a high proportion of starred chains comprising:

anionically copolymerizing styrene and butadiene monomers in a polymerization medium comprising cyclohexane, tetrahydrofuran and n-butyllithium, wherein tris-(2,4-di-tert-butylphenyl)phosphite is added to the polymerization medium during copolymerization in an amount such that the molar ratio of tris-(2,4-di-tert-butylphenyl)phosphite to n-butyllithium is between 0.2 and 0.5.

12. A process for preparing a starred polystyrene/polybutadiene copolymer having a high proportion of starred chains comprising:

anionically copolymerizing styrene and butadiene monomers in a polymerization medium comprising cyclohexane, tetramethylethylenediamine and n-butyllithium, wherein tris-(2,4-di-tert-butylphenyl)phosphite is added to the polymerization medium during copolymerization in an amount such that the molar ratio of tris-(2,4-di-tert-butylphenyl)phosphite to n-butyllithium is between 0.2 and 0.5.

* * * * *